Dec. 9, 1969     D. VOLK     3,482,906
ASPHERIC CORNEAL CONTACT LENS SERIES

Filed Oct. 4, 1965     5 Sheets-Sheet 1

INVENTOR
DAVID VOLK

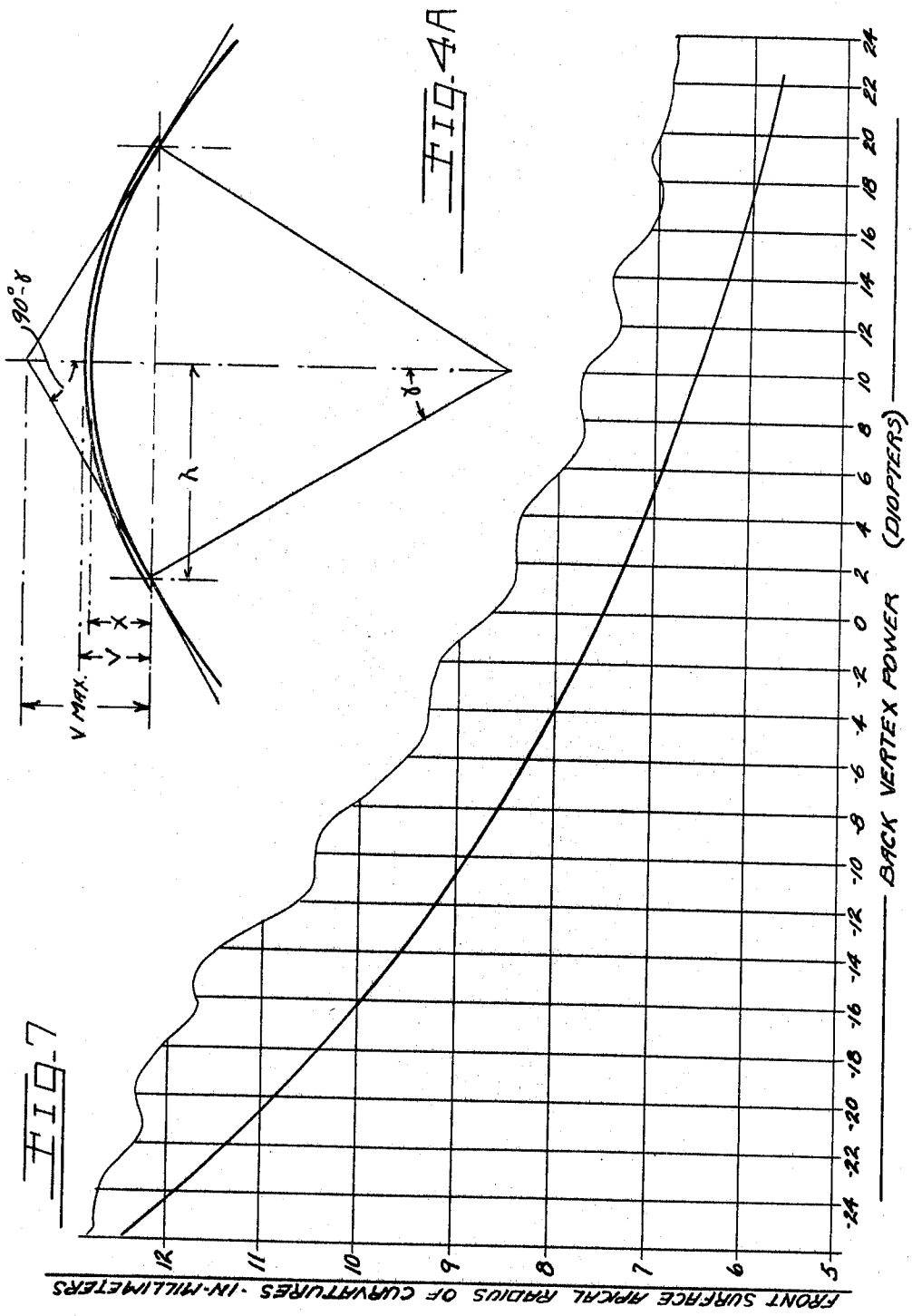

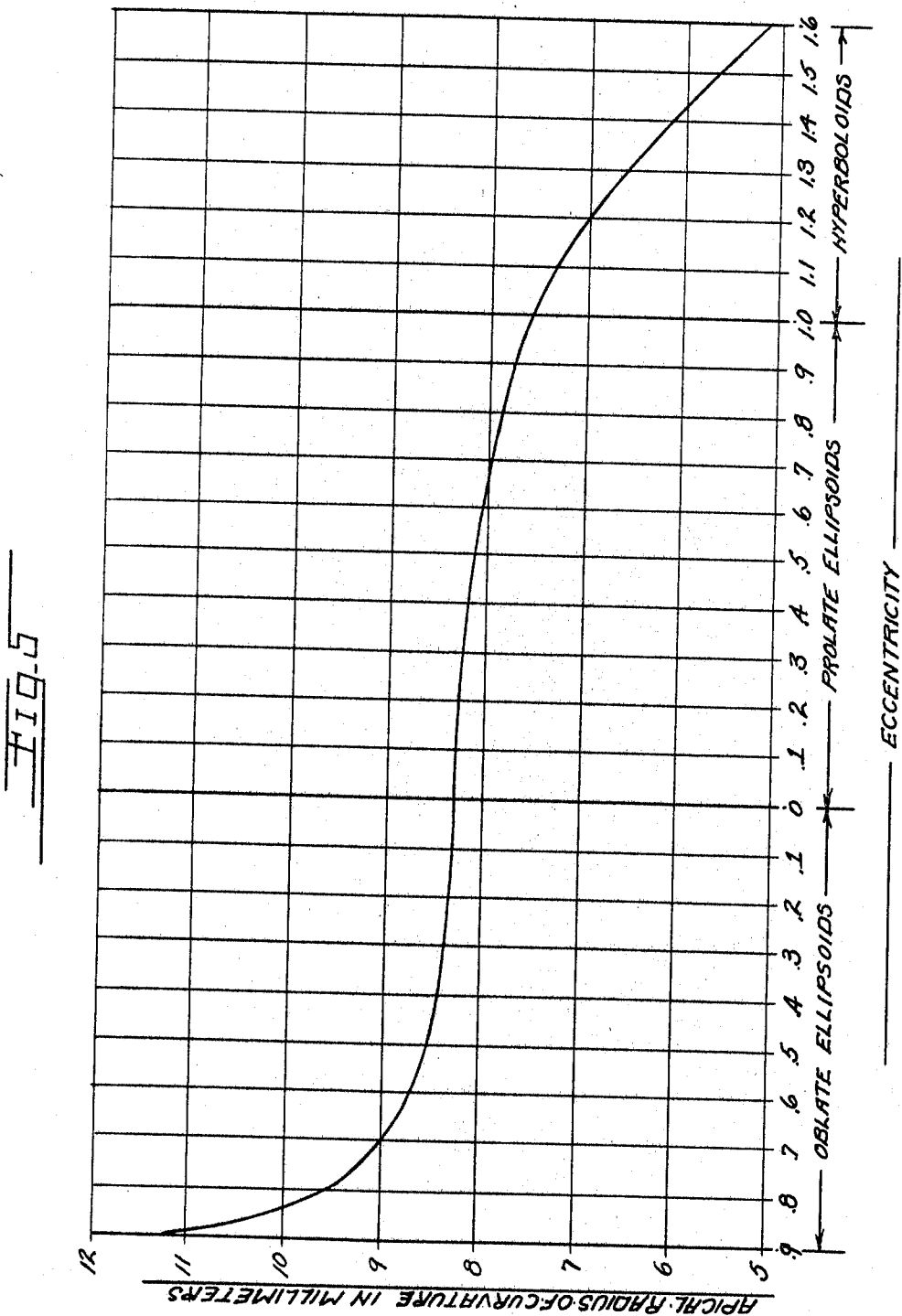

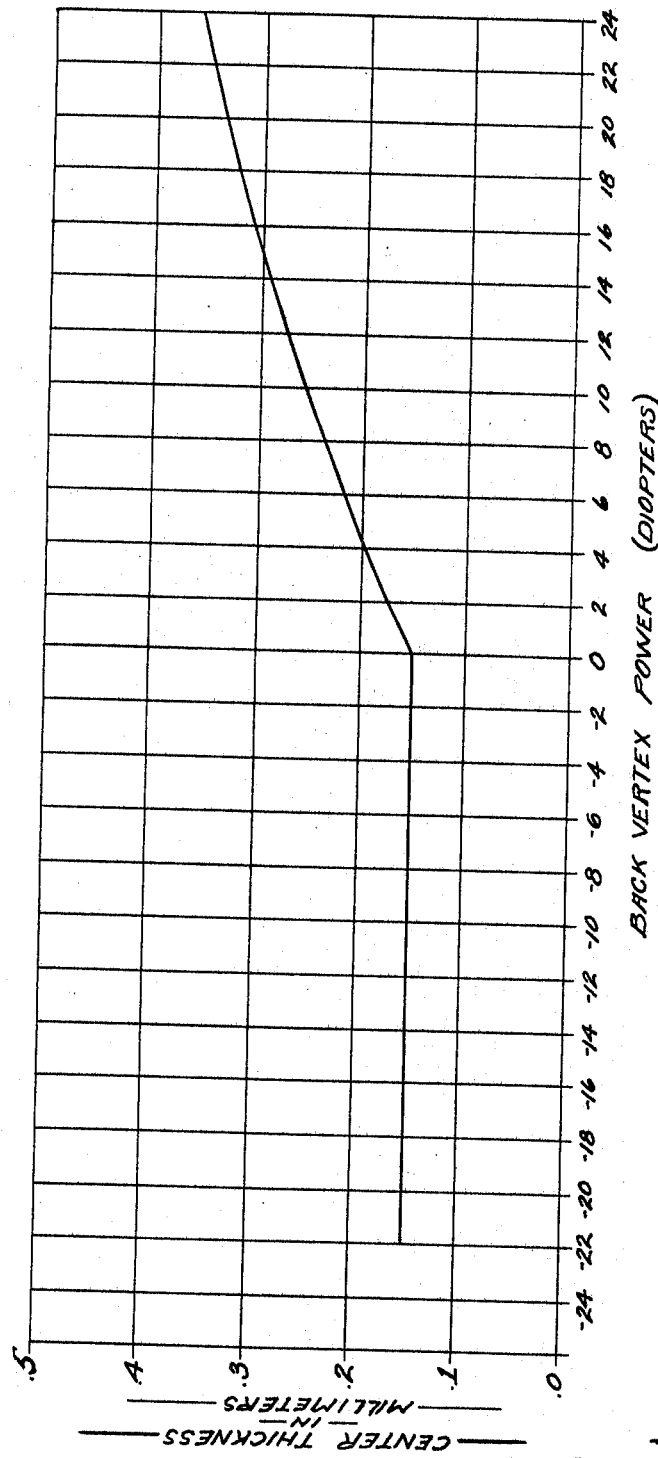

United States Patent Office 3,482,906
Patented Dec. 9, 1969

3,482,906
ASPHERIC CORNEAL CONTACT LENS SERIES
David Volk, 3336 Kersdale Road,
Pepper Pike, Ohio 44124
Filed Oct. 4, 1965, Ser. No. 492,408
Int. Cl. G02c 7/04
U.S. Cl. 351—160                7 Claims

ABSTRACT OF THE DISCLOSURE

A contact lense series is disclosed utilizing conicoids of revolution for both surfaces of the contact lens. A series of lenses is illustrated wherein the back or corneal surface thereof has apical radii of curvature ranging from 6.50 mm. to 8.50 mm. in steps of 0.05 mm. For each apical radius of curvature eccentricities are provided in the range from 0.40 to 1.60 in steps of 0.10. The lens series is designed to provide a corneal surface of the lens which is substantially of the same shape as the front surface of the cornea of the patient and the specification teaches how to coordinate the front and rear surfaces of a lens so that the entire lens is of minimum thickness and weight.

---

This invention relates to an improvement in corneal contact lens series design, utilizing conicoids of revolution, hereinafter called conoids, for both surfaces of the contact lens. This invention takes into account the curvature of the front surface of the cornea at its apex, the general shape of said corneal surface, and the thickness of the contact lens resulting from the incorporation of power in the lens. As will be elaborated upon later, the lens series is so designed as to provide corneal contact lenses in which the corneal surface of the contact lens is substantially of the same shape as the front surface of the cornea, and in which the shapes of the convex and concave surfaces of the contact lens cooperate to minimize lens thickness and weight.

In the drawings:

FIG. 4A is a view similar to FIG. 4 according to the lens series design of this invention showing a lens of minimum thickness of negative power in which the center and edge thickness are substantially equal;

FIG. 5 is graph plotting the front surface of different apical radii of curvature against eccentricity for a paraboloid base curve defining the back surface of the contact lens, all made according to this invention;

FIG. 6 is a graph plotting the central thickness of a series of lenses against the back vertex power for coaction with the paraboloid base curve according to the teaching of this invention; while FIG. 7 is a graph plotting various front surface apical radii of curvature against the back vertex power for coaction with the paraboloid base curve according to the teaching of this invention.

Figure 1:
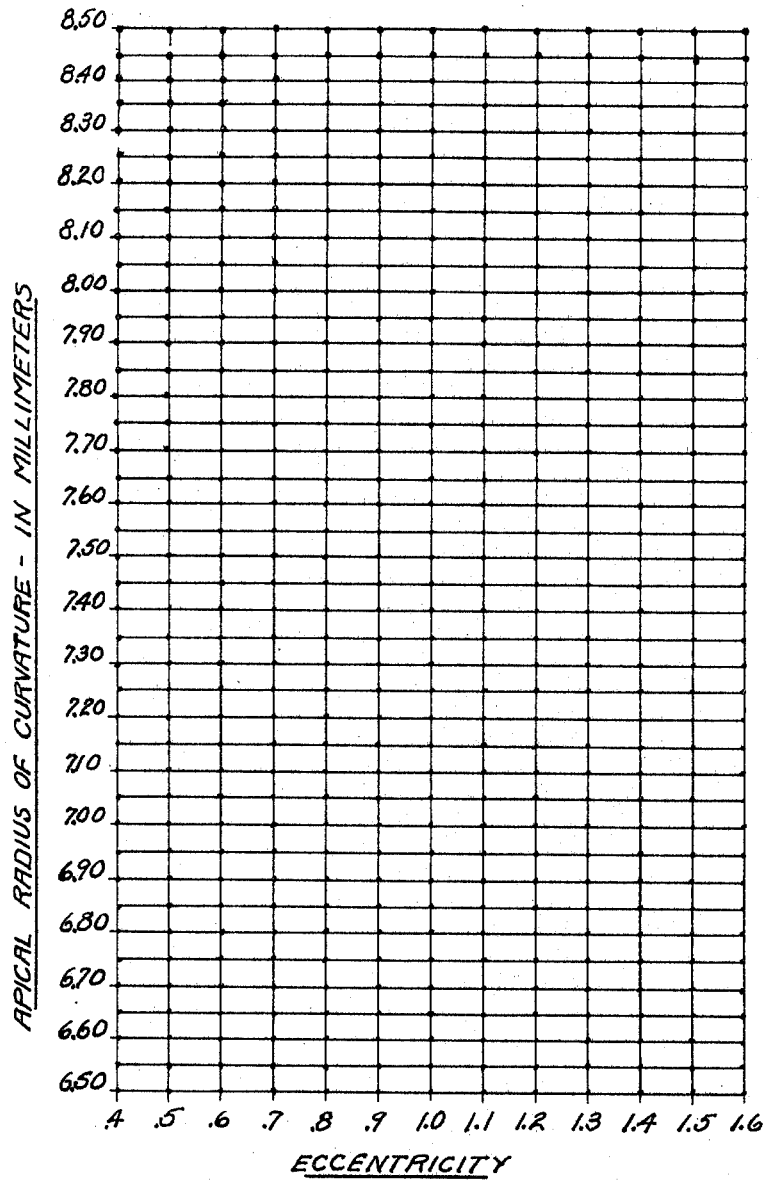
FIG. 1 represents a series of conoid lenses according to this invention for various eccentricities and for various apical radii of curvature.

At the present time, corneal contact lenses are made with spherical surfaces, with the exception that the periphery of the corneal surface of the lens may consist of narrow coaxial zones of spherical surfaces which tend to flatten the lens at the periphery. Such lenses are specified in terms of front and back surface radii of curvature, central thickness, diameter of the central optical zone which is a zone of constant curvature on the corneal side of the lens surrounded by peripheral flattened zones, dioptric power of the lens, and the overall diameter of the lens.

In the lens series of this invention, the corneal surface of each lens is either a prolate ellipsoid, a paraboloid, or a hyperboloid of two sheets, and the front surface is either an oblate ellipsoid, a sphere, a prolate ellipsoid, a paraboloid, or a hyperboloid.

Each lense of the series of this invention is then specified in terms of: the apical radius of curvatures and eccentricity of the corneal surface and the apical radius of curvature and eccentricity of the front surface, central and edge thickness, dioptric power of the lens, and overall diameter. There is no need to specify the diameter of an optical zone, as is customarily done with spherical contact lenses, since both surfaces of each lens of the series are continuous and regular.

The anterior surface of the human cornea is not spherical, though it may approach a spherical shape in rare instances, and studies of the corneal shape by keratoscopy and keratometry show that it is generally ellipsoidal in shape. It may also be generally paraboloidal or generally hyperboloidal in shape.

The corneal front surface may not have axial symmetry, as shown by those instances in which the corneal front surface is more highly curved on one side as compared to the opposite side, and in those instances in which the said surface is essentially symmetric about an axis, it may not be a surface of revolution, but may resemble an ellipsoid not of revolution, or an elliptic paraboloid, so that even at the corneal apex, there is an elliptic point. Despite all the known variations in corneal curvature (topography), contact lenses with extensive spherical surfaces have been applied to the human eye with relatively good visual results.

This invention has as one object the providing of a series of contact lenses having as the corneal or negatively curved surface, hereinafter called the base curve, a range of conoids of apical radii of curvature encompassing those found in human corneas and including those values from 6.50 mm. to 8.50 mm., and of eccentricities from 0.40 to 1.60, designed to closely approximate the known range in sizes and shapes of the human cornea.

A second object of this invention is the use of conoids, including the sphere, as the front surface of the contact lens, such that for each base curve of a specified diameter, minimum thickness lenses are obtained by the use of oblate ellipsoids, spheres, prolate ellipsoids, paraboloids, and hyperboloids in accordance to the power of the lenses as they are strongly negative, moderately negative, weakly negative, powerless, and weakly positive, moderately positive, and strongly positive, respectively.

With the combination of front and back surface conoids as taught in this invention, minimum thickness light weight contact lenses are designed, which, because of their light weight and base curve shaped generally like the cornea, will tend to remain centered on the cornea even though the lens may be of a smaller than usual diameter. Also, since both surfaces of the lenses of this invention are continuous and regular, there is no distortion of vision through the periphery of the lenses, as in the case of contact lenses with spherical surfaces only, in which, as mentioned above, there has been an attempt to flatten the corneal surface of the lens peripherally by a blending of peripheral spherical zones.

Consider first the negative surfaces of the contact lens series of this invention. The total series of base curves has as the negative surface prolate ellipsoids, paraboloids, and hyperboloids of two sheets. As an example of one subdivision of the lens series, all negative surfaces will be prolate ellipsoids of eccentricity $e=0.70$, and the apical radii of curvature in the said subdivision will range from 6.50 mm. to 8.50 mm. in steps of 0.05 mm. Other subdivisions will be of eccentricities 0.40, 0.50, 0.60, 0.80, 0.90, 1.00, 1.10, 1.20, 1.30, 1.40, 1.50 and 1.60, with the apical radii of curvature for each subdivision covering the range from 6.50 mm. to 8.50 mm., in steps of 0.05 mm. Thus the total series of base curves is designed in terms of shape (eccentricity) and magnitude (apical radius of curvature) to fit a large variety of corneas. FIG. 1 shows the pattern of such a series.

Figure 2:
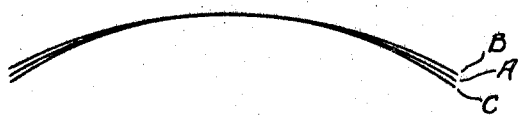
FIG. 2 is a drawing showing the meridian sections of osculating negative conoid surfaces of contact lenses, all having the same apical radius of curvature and the same diameter but of different eccentricities.

FIG. 2 is a drawing showing the meridian sections of osculating negative conoid surfaces of contact lenses, each having an apical radius of curvature of 7.50 mm., and a diameter of 8.50 mm. Surface A has an eccentricity of 1.00 (paraboloid), and surface B has an eccentricity of 1.500 (hyperboloid). Osculating both surfaces at their apices, for comparison, is a spherical surface (eccentricity=0), whose meridian section, C, also has a radius of curvature of 7.50 mm. This figure demonstrates the difference in shape of the surfaces associated with the differences in eccentricity, though the apical radius of curvature is identical for all three surfaces.

Figure 3:
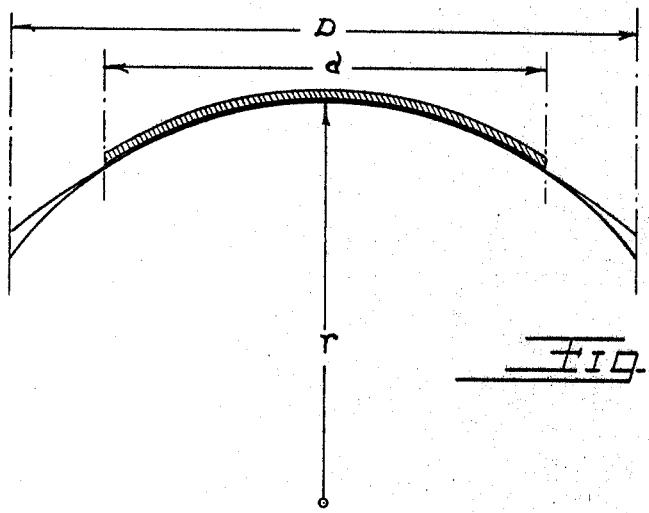
FIG. 3 is a drawing illustrating how a contact lens formed according to this invention has a negative surface which closely approximates a corneal surface.

FIG. 3 is a drawing illustrating the manner in which a contact lens whose negative surface is an ellipsoid of eccentricity $e=0.70$, and whose apical radius of curvature $r$ is 7.50 mm., and whose diameter $d$ is 8.50 mm., adapts to a corneal surface having an apical radius of curvature $r$ of 7.50 mm., a diameter $D$ of 12.00 mm., and a shape closely approximating an ellipsoid of revolution of eccentricity $e=0.70$. Between the contact lens surface and the corneal surface there is a very thin film of tear solution whose index of refraction is approximately equal to that of the cornea so that slight differences between the shape of the surface of the cornea and the negative surface of the contact lens are optically negated. A section of an osculating spherical surface $s$ is drawn for comparison with the corneal section.

The contact lens itself is held against the cornea by surface tension of the thin film of lachrymal fluid overlying the contact lens and crossing its border to the cornea. Since the negative surface of the contact lens closely matches the corneal surface, the force of the surface tension causes the contact lens to become closely applied to the cornea and to center on the cornea. If it is assumed, for purpose of description, that the cornea, which closely resembles a conoid, is itself a surface of revolution, then the close application of the similarly shaped contact lens to the cornea causes the lens and the cornea to become coaxial, or to approach coaxiality which means that the lens tends to become centered. At its periphery, the contact lens then tends to be tangential to the cornea. This is in contra-distinction to the spherical contact lens which has no single axis of symmetry and which cannot be tangent to the cornea at the periphery, but instead tends to dig into the cornea unless a peripheral bevel is ground onto the cornea surface of the lens. With a spherical surface as the corneal surface of a contact lens, the lens can be closely applied to the cornea at the apex, where it can be tangent at a point, and at the periphery, where it contacts the cornea in a circle. The centering of the spherical contact lens is thus dependent upon a circle of contact, or at most, upon a narrow circular zone of contact in a beveled lens, rather than a broad area of contact as in the conoid contact lens herein described. Hence there is much less tendency for good centering of the spherical contact lens as compared to my improved conoid contact lens.

Consider now the second aspect of the lens series of this invention which has as its object the utilization of conoids, including the sphere, as the front surface, for the purpose of minimizing lens thickness and weight. As an example, consider the subdivision of the lens series illustrated in FIG. 1, in which the base curves are paraboloids, for which $e=1$, with a range of apical radii of curvature from 6.50 mm. to 8.50 mm. in steps of 0.05 mm. Each lens of a specific base curve in the subdivision, as denoted by its apical radius of curvature, must cooperate with a range of front surfaces whose apical radii of curvature are such as to produce lenses whose back vertex power ranges from about $-20.00$ D. to $+20.00$ D. For any specilc base curve and lens diameter, front surfaces with a range of apical curvatures, each front surface being of a specific eccentricity, are required to correct the range of refractive errors generally found in clinical practice.

Figure 4:
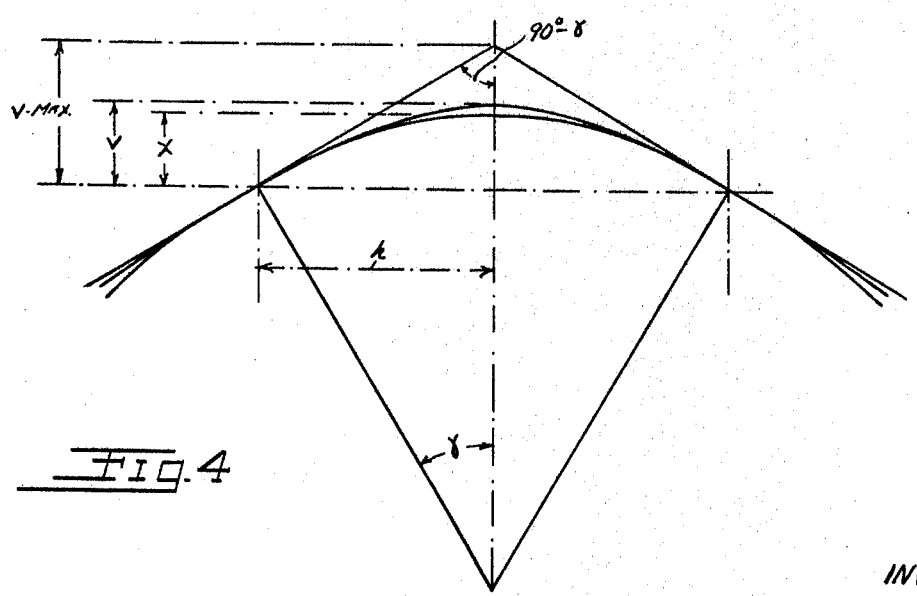
FIG. 4 is a drawing illustrating how a contact lens with center thickness greater than edge thickness, and formed according to this invention, can be of minimum thickness when the front and back surfaces have the same slope at the periphery of the lens.

Minimal thickness contact lenses, according to the lens series design of this invention, are of two basic types: (1) those in which center and edge thickness are substantially equal, (see FIG. 4A) generally negative power lenses, and (2) those in which the center thickness exceeds the edge thickness (see FIG. 4), generally positive power lenses. For those minimal thickness contact lenses not using the oblate ellipsoid as the front surface, center and edge thickness will be substantially equal providing the eccentricity of the front surface does not exceed that of the base curve. When such is the case, the specific front surfaces, in terms of eccentricities and apical radii of curvature, can be calculated by means of the following equation:

$$r = \frac{h^2}{2x} + \frac{(1-e^2)x}{2} + t \qquad (1)$$

where $x$ is the vertex depth of the base curve whose semi-diameter is $h$, $r$ is the apical radius of curvature and $e$ is the eccentricity of the conoid front surface, and $t$ is the center thickness of the lens.

Consider a base curve for which $e=1.00$ (paraboloid), $r=7.50$ mm., and $h=4.50$ mm. By means of Equation 1, the vertex depth $x$ is calculated to be 1.35 mm., $t$ not being a factor.

Now assume a spherical surface which is tangent to the paraboloid base curve at its apex, and intersects it at the vertex depth of 1.35 mm. at the 4.50 mm. semi-diameter. The eccentricity of a spherical surface is 0, and by means of Equation 1, $r$ is calculated to be 8.175 mm. If it is desired that the lens have a center and edge thickness of 0.15 mm., then $r$ of the spherical front surface will be $8.175 + 0.15 = 8.325$ mm.

As a second example, assume that the front surface is a prolate ellipsoid, coaxial with the base curve, of $e=0.70$, and $t=0.15$ mm. Then by means of Equation 1, $r$ is calculated to be 7.99 mm.

As a third example, assume that the front surface is a paraboloid, coaxial with the base curve, of $e=1$, and $t=0.15$ mm. Then by means of Equation 1, $r$ is calculated to be 7.65 mm.

For minimal thickness lenses of increasing negative power, beyond that obtained when the front surface is spherical, oblate ellipsoids of increasing eccentricity are utilized as the apical radius of curvature increases, producing lenses according to the lens series design of this invention in which center and edge thickness are substantially equal. The specific oblate ellipsoid front surfaces in terms of eccentricities $e$ and apical radii of curvature $r$, which provide minimal thickness lenses, can be calculated by means of the following equation:

$$r = \frac{h^2}{2x} + \frac{x}{2(1-e^2)} + t \qquad (2)$$

where $x$, $h$, and $t$ are as previously defined.

Consider an oblate ellipsoid coaxial with the paraboloid base curve and tangent to it at its apex, and intersecting said base curve at the 1.35 mm. vertex depth at the 4.50 mm. semi-diameter. For this base curve, oblate ellipsoids have as limiting eccentricities and apical radii of curvature, the spherical surface, $e=0$, and $r=8.175$ mm., and the oblate ellipsoid whose semi-major axis is the semi-diameter of the base curve, 4.50 mm., and whose semi-minor axis is the vertex depth $x$ of the base curve, 1.35 mm., whose eccentricity is 0.95, and whose apical radius of curvature is 40.91 mm.

As an example of a specific oblate ellipsoid front surface for a minimal thickness lens having a central thickness of 0.15 mm., consider one for which $e=0.60$. Then by means of Equation 2, $r$ is calcuated to be 8.70 mm.

Using Equations 1 and 2 I have calculated a series of $r$ values for given $e$ values for minimal thickness lenses, having substantially equal center and edge thickness of about 0.15 mm., for the paraboloid base curve of the examples. These $r$ and $e$ values are listed in Tables 1, 2 and 3.

TABLE 1.—PROLATE ELLIPSOIDS

Front surface $r$ and $e$ values for minimal thickness lenses, 0.15 mm. center thickness, for paraboloid base curve having an apical radius of curvature of 7.50 mm. and a diameter of 9.00 mm.

| $r$ (mm.) | $e$ |
|---|---|
| 8.325 | .000 |
| 8.318 | .100 |
| 8.298 | .200 |
| 8.264 | .300 |
| 8.217 | .400 |
| 8.156 | .500 |
| 8.082 | .600 |
| 7.994 | .700 |
| 7.893 | .800 |
| 7.778 | .900 |
| 7.650 | 1.000 |

TABLE 2.—OBLATE ELLIPSOIDS

Front surface $r$ and $e$ values for minimal thickness lenses, 0.15 mm. center thickness, for paraboloid base curve having an apical radius of curvature of 7.50 mm. and a diameter of 9.00 mm.

| $r$ (mm.) | $e$ |
|---|---|
| 8.332 | .100 |
| 8.353 | .200 |
| 8.392 | .300 |
| 8.454 | .400 |
| 8.550 | .500 |
| 8.705 | .600 |
| 8.970 | .700 |
| 9.525 | .800 |
| 10.082 | .850 |
| 11.203 | .900 |

When the front surface of the contact lens is not an oblate ellipsoid, and the eccentricity is greater than that of the base curve, center thickness will exceed edge thickness when the lens is made according to the lens series design of this invention. As an example, assume that the front surface is a hyperboloid and that said hyperboloid osculates the paraboloid base curve of the previous examples, at the 1.35 mm. vertex depth at the 4.50 mm. semi-diameter, i.e., there is a common tangent cone at that diameter, FIG. 4. At the same 4.50 mm. semi-diameter, there is also an orthogonal cone normal to the osculating surfaces, whose apex is on the axis of the lens at a distance $r+xe^2$ from the base curve, where $r$, $x$, and $e$ are those of the base curve. Any element of said orthogonal cone forms an angle $\gamma$ with the axis of the lens, where $$\gamma = \tan^{-1}\frac{h}{r+(e^2-1)x} \quad (3)$$

An element of said tangent cone forms an angle $90-\gamma$ with the axis of the lens and intersects the axis at a distance $V_{max}=h \tan \gamma$ from the base plane. $V_{max}$ is thus the limiting vertex depth of the osculating hyperboloid and in this example $V_{max}$ is 2.70 mm. The maximum eccentricity of the osculating hyperboloid $e_{max}$ is also a function of the cone angle and $e_{max}=\sec \gamma$. Thus for the given base curve of the example, the vertex depth of the osculating hyperboloid will be a value between 1.35 mm. and 2.70 mm. and the eccentricity will be between 1.00 and 1.94, where $\gamma=30.96°$ by means of equation (3).

The eccentricity of said osculating hyperboloid is a function of $\gamma$ and the vertex depth, $v$, of the osculating hyperboloid. For any vertex depth $v$ of the osculating front surface, where $v$ is some value between $x$ of the base curve and $v_{max}$ of the front surface, the value of the eccentricity $e$ of the front surface is obtained by the following equation:

$$e=\left(\frac{2n}{v\tan}-\frac{h^2}{v^2}+1\right)^{1/2} \quad (4)$$

where $h$ is the semi-diameter of the base curve.

The apical radius of curvature of the front surface is obtained by means of the following equation:

$$r=\frac{h^2}{2v}-\frac{(e^2-1)v+t}{2} \quad (5)$$

where $e$ is the eccentricity of the front surface of the given vertex depth $v$, and $t$ is the desired edge thickness of the lens. The center thickness of the lens is then $v-x+t$.

By means of equations (4) and (5), I have calculated a series of $r$ and $e$ values listed in Table 3, along with center thickness of the lens, for the front surface hyperboloids for minimal thickness lenses, said hyperboloids to be used in conjunction with the paraboloid base curve of the examples.

TABLE 3.—HYPERBOLOIDS

Central lens thickness and front surface $r$ and $e$ values for minimal thickness lenses having about a 0.15 mm. edge thickness, for a paraboloid base curve having an apical radius of curvature of 7.50 mm. and a diameter of 9.00 mm.

| Center thickness (mm.) | $r$ (mm.) | $e$ |
|---|---|---|
| .16 | 7.540 | 1.040 |
| .17 | 7.431 | 1.077 |
| .18 | 7.324 | 1.112 |
| .19 | 7.218 | 1.145 |
| .20 | 7.114 | 1.176 |
| .21 | 7.012 | 1.205 |
| .22 | 6.911 | 1.233 |
| .23 | 6.811 | 1.260 |
| .24 | 6.713 | 1.285 |
| .25 | 6.616 | 1.309 |
| .30 | 6.150 | 1.414 |
| .35 | 5.715 | 1.500 |

Using the data from Tables 1, 2 and 3, I have drawn a graph, FIG. 5, of $r$ vs. $e$ for the front surfaces used in conjunction with the paraboloid base curve of the examples, subdividing the graph by vertical lines into three portions: (1) the values of $r$ and the associated values of $e$ for the oblate ellipsoids, (2) the values of $r$ and the associated values of $e$ for the prolate ellipsoids, i.e., for those values of $e$ less than and including the value of the base curve, and (3) for those values of $r$ and the associated values of $e$ for the hyperboloids, i.e., for those values of $e$ greater than that of the base curve. The values for $r$ in FIG. 5 are based upon a center and edge thickness for the oblate and prolate ellipsoids, and an edge thickness for the hyperboloids of about 0.15 mm. In FIG. 6 I have plotted the center thickness of the lenses against the back vertex power, assuming that the lenses are made of methyl methacrylate of index of refraction 1.49.

In FIG. 7, I have plotted the apical radii of curvature of the front surface against the back vertex power of the lenses.

Data for the production of minimal thickness lenses, as shown graphically in FIGS. 3, 5, 6 and 7, for one base curve and diameter of the series of lenses of this invention can be computed by means of Equations 1 through 5 for all base curves and diameters in the complete series with diameters ranging from about 7.50 mm. to 10.50 mm., which is the range of lens diameters generally used in clinical practice with corneal contact lenses. It is to be understood that small variations in lens diameter necessitate small changes in eccentricity of the convex surface of the contact lens of a specific base curve, if minimal thickness lenses are to be obtained. It is also to be understood that although 0.15 mm. is a satisfactory minimal center and/or edge thickness for contact lenses, greater and lesser thicknesses may be used without departing from the intent of this invention.

When a contact lens of the lens series of this invention is ordered to meet the specifications of a prescription, the order to the manufacturer will include the following data:

(1) Apical radius of curvature of the cornea;
(2) Eccentricity or approximate eccentricity of the cornea;
(3) Diameter of the contact lens;
(4) Power of the prescribed contact lens.

By referring to graphs similar to FIGS. 5, 6 and 7, for the prescribed base curve and diameter, the front surface apical radius of curvature and eccentricity, and the center thickness of the lens, can be obtained by selecting the $r$, and $t$ values corresponding to the prescribed lens power, and the $e$ value corresponding to the $r$ value.

The production of the exact conoid surfaces for the lens series of this invention is accomplished by apparatus and methods disclosed in my copending patent applications as follows.

Exact positive and negative prolate ellipsoids, paraboloids, and hyperboloids of two sheets can be generated by the direct machining method described in my United States Patent for "Method and Apparatus for Producing Aspheric Contact Lenses," No. 3,344,692, granted Oct. 3, 1967, in which the said surfaces are generated by machine tools having edges in the form of ellipses, said elliptical edges being oriented and positioned with respect to the surface generated, in a predetermined manner, so as to produce the desired surface.

Exact positive prolate and oblate ellipsoids can be produced by a direct machining method described in my United States Patent No. 3,218,765, granted Nov. 23, 1965, for "Lens Generating Method," my United States Patent No. 3,267,617, granted Aug. 23, 1966 for "Lens Generating Apparatus," which describe the production of prolate and oblate ellipsoids by tools having circular generating edges, the planes of said circular generating edges being oriented and positioned in a predetermined manner with respect to the surface to be generated, said circular edges being made to move across the surfaces, as the lens material rotates about its axis of revolution.

Exact positive and negative prolate and oblate ellipsoids can be generated by the method and apparatus described in my United States Patent No. 3,239,967 granted Mar. 15, 1966 for "Lens Surface Generator," in which a rotating generating tool in the form of a circular disc, is made to follow a predetermined path by means of a cylindrical cam follower, of the same diameter as the circular grinding tool, rolling along a circular edge of predetermined radius of curvature, the plane of said circular edge being oriented and positioned in a predetermined manner with respect to the surface to be generated.

Wherever in the specification and claims I have referred to corneal contact lenses, I mean to include scleral contact lenses also which differ from the corneal type in that a thicker layer of tear solution is interposed between the back surface of the optical portion of the lens and the cornea, this being achieved by a scleral flange of the lens material adjoined to the corneal portion and resting upon the sclera. This invention, however, makes possible a substantially uniform and minimal thickness of the tear solution between the entire surface of the cornea and the optical portion of the lens.

What is claimed is:

1. A series of corneal contact lenses with the corneal surface of each lens being a continuous and regular aspheric surface of revolution of conoid type which decreases in curvature from apex to peripheral edge, said lenses being arranged with reference to their corneal surfaces in a graded series of apical radii of curvature of said surfaces with values ranging from 6.50 mm. to 8.50 mm. in steps of 0.05 mm. and having eccentricities of 0.4 to 1.6 in steps of 0.1 units for each apical radius, and of sufficient thickness for providing optically coacting front surfaces.

2. A series of corneal contact lenses as defined in claim 1 in which the optically coacting front surfaces are oblate ellipsoids with eccentricities from 0.0 to 0.9.

3. A series of corneal contact lenses as defined in claim 1 in which the optically coacting front surfaces are prolate ellipsoids with eccentricities from 0.0 to 1.0.

4. A series of corneal contact lenses as defined in claim 1 in which the optically coacting front surfaces are hyperboloids with eccentricities from 1.0 to 1.80.

5. A series of corneal contact lenses as defined in claim 1 in which for generally negative power lenses of center thickness $t$, semi-diameter $h$, and in which the corneal surface has a vertex depth $x$, the eccentricity of the front surface being not greater than that of the corneal surface, lenses with substantially equal center and edge thickness are made when the front surface being a conoid of decreasing curvature from apex to peripheral edge, has an apical radius of curvature $r$ and an eccentricity $e$ related to the corneal surface by the equation:

$$r = \frac{h^2}{2x} + \frac{(1-e^2)x}{2} + t$$

6. A series of corneal contact lenses as defined in claim 1 in which for generally negative power lenses of center thickness $t$, semi-diameter $h$, and in which the corneal surface has a vertex depth $x$, lenses with substantially equal center and edge thickness are made when the front surface, being an oblate ellipsoid, has an apical radius of curvature $r$, and an eccentricity $e$ related to the corneal surface by the equation:

$$r = \frac{h^2}{2x} + \frac{x}{2(1-e^2)} + t$$

7. A series of corneal contact lenses as defined in claim 1 in which for generally postive power lenses of semi-diameter $h$ and in which the corneal surface has a vertex depth $x$ and eccentricity $e_{base}$ and an apical radius of curvature $r_{base}$, lenses with minimal center thickness and of edge thickness $t$ are made when the front surface is a conoid of decreasing curvature from apex to peripheral edge of eccentricity $e$, of vertex depth $v$ and of apical radius of curvature $r$, when $$e = \left(\frac{2h}{v \tan \gamma} - \frac{h^2}{v^2} + 1\right)^{1/2}$$

and $$r = \frac{h^2}{v^2} - \frac{(e^2-1)v}{2} + t$$

where $$\gamma = \tan^{-1} \frac{h}{r_{base} + (e^2_{base}-1)x}$$

(References on following page)

References Cited

UNITED STATES PATENTS

| | | | |
|---|---|---|---|
| 1,356,670 | 10/1920 | Tillyer | 351—176 |
| 1,507,212 | 9/1924 | Silberstein | 350—189 |
| 3,187,338 | 6/1965 | Neefe | 351—160 |
| 3,227,507 | 1/1966 | Feinbloom | 351—160 |

FOREIGN PATENTS

| | | |
|---|---|---|
| 620,852 | 3/1949 | Great Britain. |

OTHER REFERENCES

Elliot "A Preliminary Report on Use of Gradient Ellipsoidal Curves Relative to Fitting Contact Lenses," article in The Optometric Weekly, vol. 55, No. 21, May 21, 1964, pp. 21 and 22 cited.

DAVID H. RUBIN, Primary Examiner

U.S. Cl. X.R.

350—189; 351—176

UNITED STATES PATENT OFFICE
CERTIFICATE OF CORRECTION

Patent No. 3,482,906                      December 9, 1969

David Volk

It is certified that error appears in the above identified patent and that said Letters Patent are hereby corrected as shown below:

Column 6, formula (4) should appear as shown below:

$$e = \left( \frac{2h}{v \tan \gamma} - \frac{h^2}{v^2} + 1 \right)^{1/2}$$

Signed and sealed this 27th day of October 1970.

(SEAL)
Attest:

Edward M. Fletcher, Jr.                WILLIAM E. SCHUYLER, JR.

Attesting Officer                             Commissioner of Patents